(12) United States Patent
Colford

(10) Patent No.: US 9,631,666 B1
(45) Date of Patent: Apr. 25, 2017

(54) PLASTIC EXPANDABLE BOLT THREAD PROTECTOR

(71) Applicant: Genplex, Inc., Skowhegan, ME (US)

(72) Inventor: Duane Colford, Sowhegan, ME (US)

( * ) Notice: Subject to any disclaimer, the term of this patent is extended or adjusted under 35 U.S.C. 154(b) by 28 days.

(21) Appl. No.: 14/736,293

(22) Filed: Jun. 11, 2015

(51) Int. Cl.
*A47G 3/00* (2006.01)
*F16B 43/00* (2006.01)
*F16B 37/12* (2006.01)

(52) U.S. Cl.
CPC .............. *F16B 43/00* (2013.01); *F16B 37/12* (2013.01)

(58) Field of Classification Search
CPC .................................. A47G 3/00; F16L 19/005
USPC ........................................................ 411/377
See application file for complete search history.

(56) References Cited

U.S. PATENT DOCUMENTS

| | | | | |
|---|---|---|---|---|
| 600,892 A * | 3/1898 | Schirra | .................. | B65D 59/06 138/96 T |
| 2,195,530 A * | 4/1940 | Curtis | .................... | B65D 59/06 138/96 T |
| 2,551,834 A * | 5/1951 | Ferguson | ................ | B29C 41/14 138/96 T |
| 2,632,479 A * | 3/1953 | Pfeil | ...................... | B65D 59/00 138/96 T |
| 3,190,536 A * | 6/1965 | Schwartz | ............... | B65D 65/40 138/96 R |
| 3,496,800 A * | 2/1970 | Brezinski | ................. | B62D 7/16 138/96 R |
| 3,840,052 A * | 10/1974 | Schmidt | ................. | B65D 59/08 138/96 T |
| 4,033,380 A * | 7/1977 | Weber | ................... | F16L 57/005 138/96 T |
| 4,239,062 A * | 12/1980 | Callicoatte | ............ | F16L 57/005 138/96 R |
| 4,501,301 A * | 2/1985 | Snow, Sr. | ........... | B29C 45/4407 138/96 T |
| 6,238,505 B1 * | 5/2001 | Bulger | .................... | F16B 37/14 156/60 |
| 2005/0120665 A1 * | 6/2005 | Anderson | ............. | E04B 1/2604 52/698 |

* cited by examiner

*Primary Examiner* — Roberta Delisle
(74) *Attorney, Agent, or Firm* — Joseph E. Funk

(57) ABSTRACT

A plastic expandable bolt thread protector is disclosed that protects the threads of a bolt over which the thread protector is placed either just before shipping a bolt or just before a bolt is put to use. The thread protector is made of a rigid but flexible material having inwardly extending protrusions or pointed segments extending from the wall of the protector into a hollow interior of the protector and when the protector is axially placed over the bolt threads the protrusions or pointed segments create an interference fit with the bolt threads that holds the protector on the bolt threads, and when there is a greater interference fit the wall of the protector deforms and expands outwardly.

3 Claims, 3 Drawing Sheets

US 9,631,666 B1

PLASTIC EXPANDABLE BOLT THREAD PROTECTOR

FIELD OF THE INVENTION

This invention relates to a thread protector to be used with bolts that have a wide range manufacturing tolerance.

BACKGROUND OF THE INVENTION

Bolts may typically have a function to support the building structure for hanging piping for electrical, sewer, air conditioning, heating, or duct systems. Bolts are also used for the purpose of fastening machinery, process equipment, storage vessels, lamp posts, railings and columns. Bolts are also used in the automotive, aircraft and almost all other industries. In addition, bolts are used to fasten the base plate of building framing to a foundation.

There are manufacturing tolerances in the diameter of the threaded shaft of large cast bolts. Currently, large cast bolts vary in diameter due to the casting process by which they are made. Example, a nominal 0.500 inch diameter threaded cast bolt will vary in diameter between 0.470 inches to 0.495 inches. This wide tolerance range interferes with existing thread protective means that have narrower tolerance ranges.

Thus, there is a need in the prior art for a simple and inexpensive means to protect the threads of a wide tolerance cast bolt. This new thread protector must be easily and quickly placed over the threads of bolts having a wide tolerance range and must be easily and quickly removed from the bolts after their installation. The new thread protector must protect the threads of a bolt over which it is placed from being fouled or damaged.

SUMMARY OF THE INVENTION

The previously described problems in the prior are solved by the present invention which may be used in many applications. The invention is a disposable or reusable, flexible plastic sleeve called a plastic expandable bolt thread protector herein. In a preferred embodiment of the invention the novel thread protector is easily inserted over the threaded shaft of a cast bolt prior to shipping the bolts, or the thread protector is placed over the threaded shaft of a cast bolt after it is installed. The thread protectors are removed at a later time when a nut and washer(s) are to be threaded onto the shaft of a bolt.

Bolts are typically made by a casting process and have a tolerance range in the diameter of their threaded shafts. For one example, the diameter of a nominal 0.500 inch bolt can range between 0.470 inches and 0.495 inches. This relatively wide variation causes a problem with the use of prior art thread protectors over the threaded shaft of a bolt since the inside diameter of an extruded plastic thread protector has minimal variation. To compensate for this tolerance range in the diameter of the threaded shafts of existing bolts the novel thread protector has means for compensating for the tolerance range in the diameter of the threaded shafts of the bolts. First, the novel thread protector is made of plastic, such as polycarbonate, rigid PVC, ABS or propropylene which all have minimal creep over time, and are designed to be flexible by varying the wall thickness and can be pushed over the threaded shaft of a bolt and create an interference fit thereon. Second, there are a plurality of internal ribs longitudinally located on the inside wall of the thread protectors that run parallel to the axis of the thread protector. These longitudinal ribs flex away from the axis of the thread protector as it is pushed over the threaded shaft of a bolt. This allows the thread protector to fit various diameter threaded shafts of bolts and always create an interference fit that holds the thread protector to the threaded shaft of a bolt. This situation occurs with relatively large diameter cast bolts which have a wide tolerance range in the diameter of their threaded portions. In one embodiment of the invention the novel thread protector has a circular cross-section shape, and in another embodiment of the invention the novel thread protector does not have a circular cross-section shape.

DESCRIPTION OF THE DRAWING

The invention will be better understood reading the following Detailed Description in conjunction with the drawing in which.

DETAILED DESCRIPTION

Figure 1:
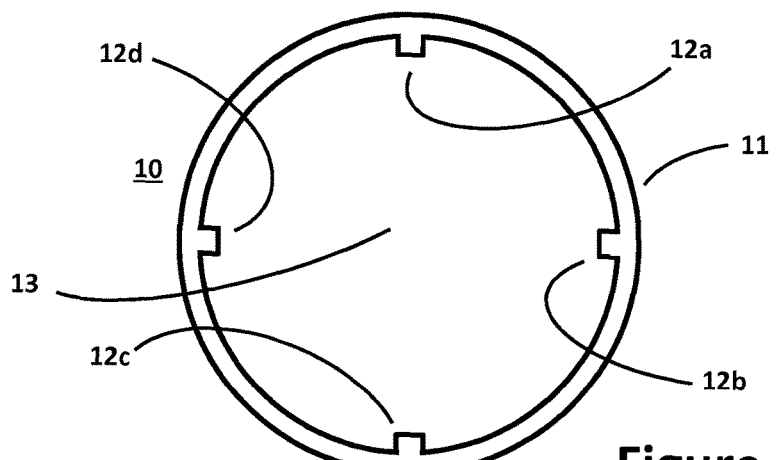
FIG. 1 is a cross-section view of a tubular thread protector in accordance with a first embodiment of the invention with no bolt threaded portion therein.

In FIG. 1 is shown an axial, cross sectional view of a thread protector 10 in accordance with a first embodiment of the invention. There is no bolt threaded portion shown therein. Thread protector 10 is tubular and has a circular cross-section wall 11 with a hollow center area 13. Extending inwardly from the inside of wall 11 are four equispaced protrusions 12 that provide an interference fit to the threads of a bolt (not shown in FIG. 1) over which thread protector 10 is placed when used in accordance with the teaching of the invention. Thread protector 10 is preferably made by extrusion using polycarbonate, rigid PVC, ABS or propropylene, but may also be extruded of other thermoplastics and rubber. In the extrusion process the material is continuously extruded and, after cooling, the extruded material is cut in specific lengths to make the tubular thread protectors 10. The length is chosen to cover the threads of bolts with which the thread protectors 10 will be utilized. As previously mentioned, a nominal 0.500 inch diameter threaded bolt will vary in diameter between 0.470 inches and 0.495 inches.

In FIG. 1 there are opposing pairs of protrusions 12. Protrusion 12a is opposite protrusion 12c and protrusion 12b is opposite protrusion 12d. The spacing between the tips of the opposite protrusions is slightly less than 0.470 inches to create an interference fit to the threads of a bolt, when the diameter of the threaded portion of the bolt is at a low and tolerance of 0.470 inches. While four protrusions 12a-d are shown in FIGS. 1-3, at least three protrusions 12 must be provided and greater than four protrusions may also be provided.

Figure 2:
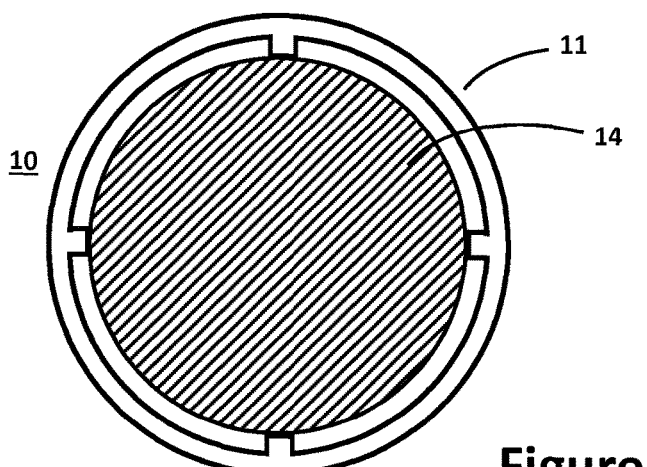
FIG. 2 is a cross-section view of the tubular thread protector in accordance with the first embodiment of the invention mounted over the threaded shaft of a relatively smaller diameter bolt.
Figure 3:
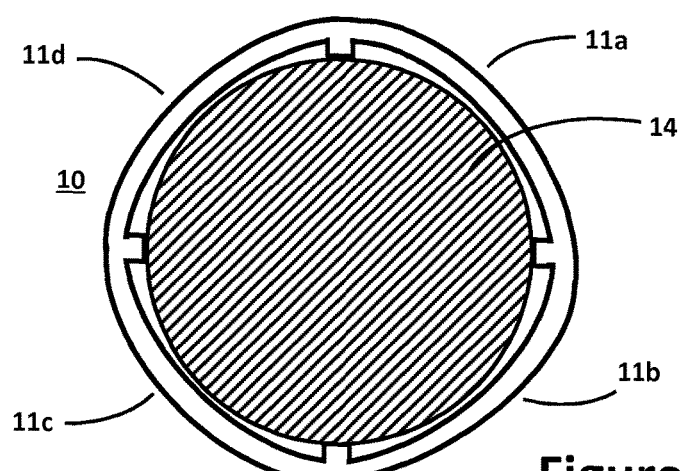
FIG. 3 is a cross-section view of the tubular thread protector in accordance with the first embodiment of the invention mounted over the threaded shaft of a maximum diameter bolt.

In FIG. 2 is shown the thread protector 10 of the first embodiment of the invention shown in FIG. 1 after it has been slid over the threaded portion 14 of a bolt and the threaded portion 14 has a diameter of 0.470 inches. This creates an interference fit between the threaded portion 14 and the protrusions 12a-d of the thread protector 10, but the interference fit is not great enough to noticeably distort thread protector 10. The interference fit ensures that thread protector 10 will remain on the threaded portion 14 of a bolt until it is intentionally removed.

in FIG. 3 is shown the thread protector 10 of the first embodiment of the invention shown in FIG. 1 after it has been slid over the threaded portion 14 of a bolt and the threaded portion 14 has a maximum tolerance diameter of 0.495 inches. This creates a greater interference fit between the threaded portion 14 of the bolt and the protrusions 12a-d of the thread protector 10 and the interference is great enough to noticeably distort thread protector 10. This distortion is seen in FIG. 3. With this greater distortion protrusions 12a-d are spread further from each other which causes the wall segments 11a-d to be drawn inward toward the center area of thread protector 10 as shown.

Figure 4:
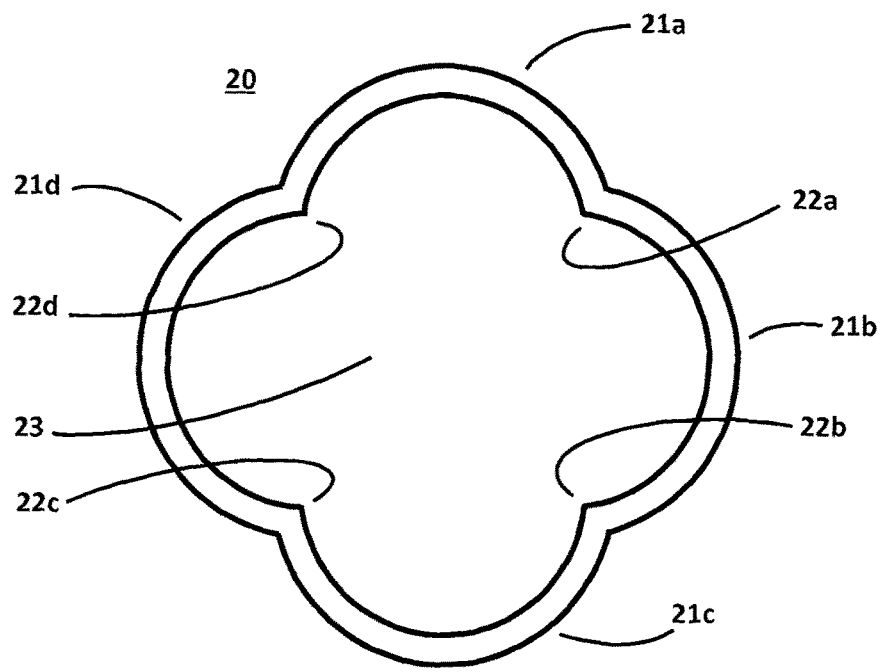
FIG. 4 is a cross-section view of a tubular thread protector that is not round in accordance with a second embodiment of the invention which is not mounted over the threaded portion of a bolt.

In FIG. 4 is shown an axial, cross sectional view of a thread protector 20 in accordance with a second embodiment of the invention. There is no bolt threaded portion 24 shown therein. In this second embodiment thread protector 20 does not have a circular cross-section wall but has the cross-sectional shape created by the four arcuate wall segments 21a-d. Thread protector 20 has a hollow center area 23 but it does not have a circular cross-section. The shape creates four inwardly projecting points 22a-d as shown which will create an interference fit with the bolt threaded shaft 24 over which thread protector 20 is placed. While four projecting points 22a-d are shown in FIGS. 4 and 5, at least three projecting points 22 must be provided and greater than four projecting points 22 may also be provided.

Figure 5:
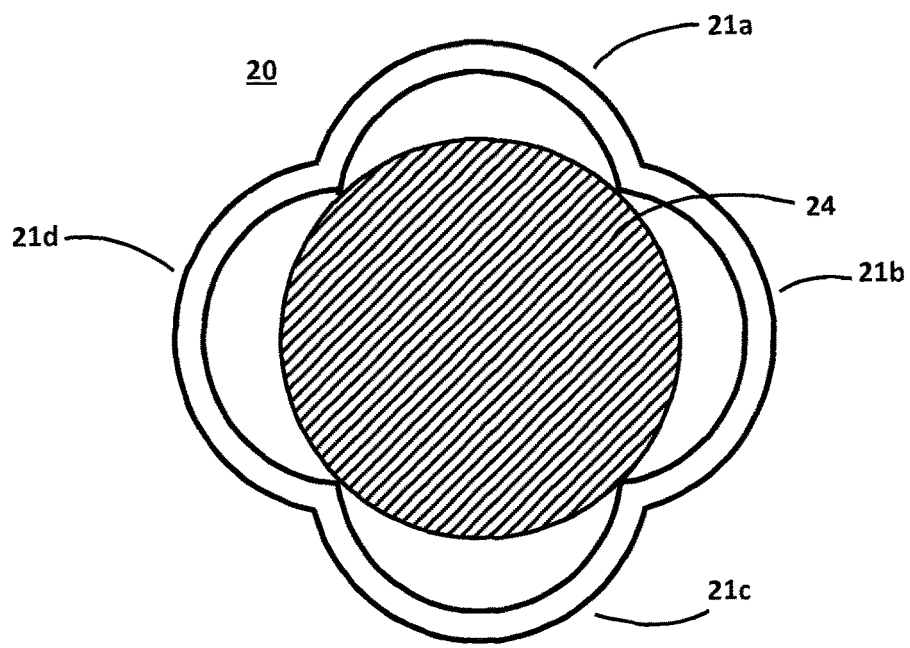
FIG. 5 is a cross-section view of the tubular thread protector that is not round in accordance with the second embodiment of the invention which is mounted over the threaded portion of a bolt.

The spacing between opposing points 22a and 22c, and points 22b and 22d is slightly less than 0.470 inches to create an interference fit to the threads of a bolt, when the diameter of the threaded portion 24 of the bolt is 0.470 inches. The interference fit is not great enough to noticeably distort thread protector 20. The interference fit ensures that thread protector 20 will remain on the threaded portion 24 of a bolt until it is intentionally removed.

in FIG. 5 is shown the thread protector 20 shown in FIG. 4 after it has been slid over the threaded portion 24 of a bolt and the threaded portion 24 has a diameter of 0.470 inches. This creates an interference fit between the threaded portion 24 of a bolt and the points 22a-d. This interference fit is small enough that it does noticeably distort thread protector 20.

When a bolt having a threaded portion 24 with a diameter of 0.495 inches has thread protector 20 slid there over the interference fit is greater and creates some distortion of thread protector 20, similar to the distortion shown in FIG. 3 for the first embodiment of the invention.

Figure 6:
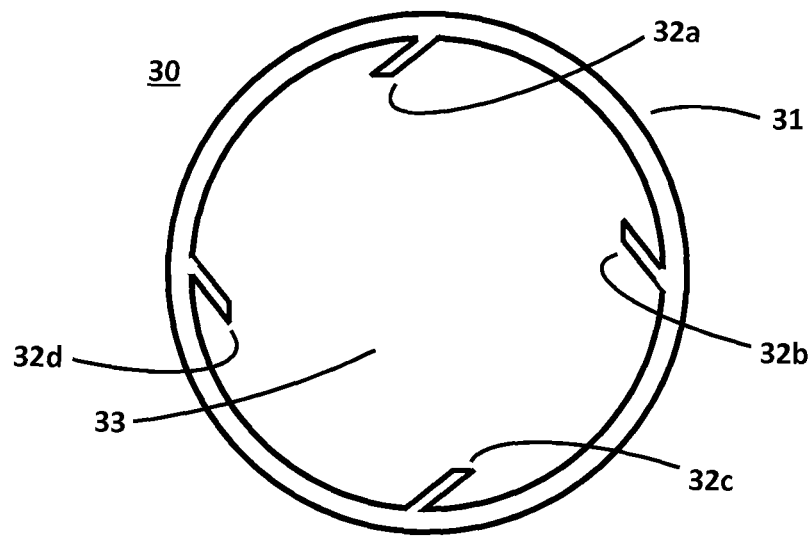
FIG. 6 is a cross-section view of a tubular thread protector in accordance with a third embodiment of the invention which is not mounted over the threaded portion of a bolt.

In FIG. 6 is shown an axial, cross-section view of a thread protector 30 in accordance with a third embodiment of the invention. There is no bolt threaded portion 34 shown therein. In this third embodiment thread protector 30 has a circular cross-section wall 31. Thread protector 30 has a hollow center area 33. Thread protector 30 has opposing pairs of protrusions 32. Protrusion 32a is opposite protrusion 32c and protrusion 30b is opposite protrusion 32d. These protrusions 32 are flexible tabs that extend inwardly at an angle as shown. The spacing between the tips of opposing protrusions is slightly less than 0.470 inches to create an interference fit with the threads of a bolt when the diameter of the threaded portion 34 of a bolt is 0.470 inches. While four protrusions 32a-d are shown in FIGS. 6 and 7, at least three protrusions 32 must be provided and greater than four protrusions 32 may also be provided.

Figure 7:
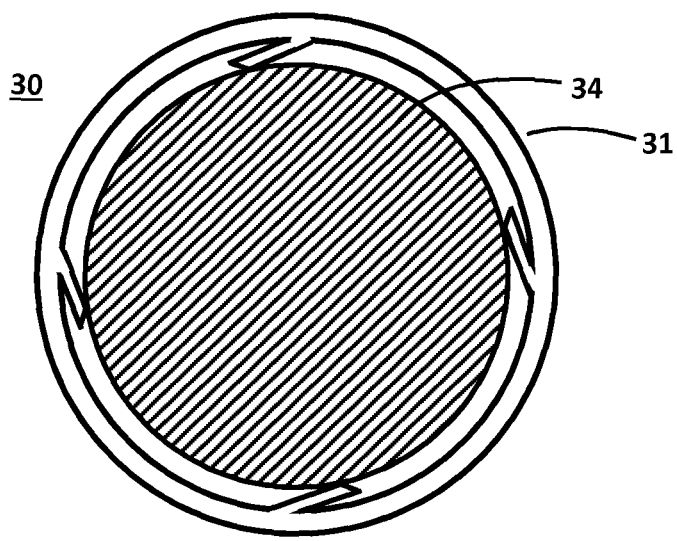
FIG. 7 is a cross-section view of the tubular thread protector in accordance with the third embodiment of the invention with which is mounted over the threaded portion of a bolt.

In FIG. 7 is shown the thread protector 30 of the third embodiment of the invention shown in FIG. 6 after it has been slid over the threaded portion 34 of a bolt and the threaded portion 34 has a diameter of 0.470 inches. This creates an interference fit between the threaded portion 34 and the protrusions 32a-d of thread protector 30 but the interference fit is not great enough to noticeably distort thread protector 30. The interference fit ensures that thread protector 30 will remain on the threaded portion 34 of a bolt until it is intentionally removed.

When a bolt with a threaded portion 34 having a diameter of 0.495 inches has thread protector 30 slid there over the interference fit is greater and will push protrusions 32a-d against the inside of wall 31 as shown.

While what is described herein are three embodiments of the invention, those skilled in the art will recognize that numerous changes may be made without departing from the spirit and scope with the invention.

What is claimed is:

1. A thread protector for the threaded portion of a bolt comprising:
    a hollow, elongated, tubular member made of a rigid material that has flexibility and is deformed outwardly when the elongated tubular member is in use as a thread protector, the hollow elongated member having a wall with an inside surface; and
    a plurality of protrusions extending inwardly from the inside surface of the wall of the hollow elongated member;
    wherein when the thread protector is placed over the threads of a bolt it flexes and is deformed outwardly due to an interference fit of its inwardly extending protrusions with the threaded sides of the bolt and this interference fit holds the protector on the bolt threads.

2. A thread protector for the threaded portion of a bolt comprising:
    a hollow elongated member made of a rigid material that has flexibility and may be deformed, the hollow elongated member having a wall with an inside surface;
    wherein the wall of the hollow elongated member of the thread protector has a plurality of arcuate contiguous sections and the ends of each arcuate section turn inward toward the interior of the hollow elongated member, and at the point where any two contiguous sections join, the wall creates a pointed segment that extends into the interior of the thread protector and each pointed segment contacts the threads on a bolt on which the hollow elongated member is mounted;
    wherein the elongated member of the thread protector has a cross sectional shape that is never circular, and there are no protrusions extending inwardly from the inside surface of the wall of the elongated member between the pointed segments created where any two contiguous arcuate sections are joined;

wherein the threaded portion of the bolt has a manufacturing tolerance range between a first diameter and a second diameter, and when the hollow elongated member is placed over the threaded portion of a bolt having the first diameter there is a small interference fit between the threaded portion of the bolt and the inwardly extending pointed segments at the juncture of contiguous arcuate wall sections, the interference fit being sufficient to retain the hollow elongated member on the threaded portion of the bolt, and wherein when the hollow elongated member is placed over the threaded portion of a bolt having the second diameter there is a greater interference fit between the bolt threaded portion and the inwardly extending pointed segments that distorts the wall of the hollow elongated member.

3. A thread protector for the threaded portion of a bolt comprising:

a hollow elongated member made of a rigid material that has flexibility and portions of it are deformed when the elongated member is placed on the threaded portion of the bolt, the hollow elongated member having a wall with an inside surface;

the hollow elongated member has a plurality of protrusions extending inwardly from the inside surface of the wall of the elongated member, each protrusion extending inwardly at an acute angle with respect to the inside surface of the wall, and the elongated member has a cross sectional shape that is always circular both when it is not being used as a thread protector and when it is placed on the threaded portion of a bolt as thread protector;

wherein the threaded portion of the bolt has a manufacturing tolerance range between a first diameter and a second diameter, and when the hollow elongated member is placed over the threaded portion of a bolt having the first diameter there is a small interference fit between the threaded portion of the bolt and the inwardly extending protrusions, the interference fit being sufficient to retain the hollow elongated member on the threaded portion of the bolt, and wherein when the hollow elongated member is placed over the threaded portion of a bolt having the second diameter there is a greater interference fit between the threaded portion of the bolt and the inwardly extending protrusions, and the greater interference creates a force that bends the acute angle protrusions closer to the inside surface of the wall of the elongated member.

* * * * *